United States Patent [19]

Iida et al.

[11] Patent Number: 4,924,252
[45] Date of Patent: May 8, 1990

[54] ELECTRONIC FLASH DEVICE FOR CAMERA

[75] Inventors: Yoshikazu Iida, Chigasaki; Nobuyoshi Hagiuda, Kawasaki; Norikazu Yokonuma, Tokyo; Hiroshi Sakamoto, Kawasaki; Hideki Matsui, Yokohama, all of Japan

[73] Assignee: Nikon Corporation, Tokyo, Japan

[21] Appl. No.: 330,288

[22] Filed: Mar. 29, 1989

[30] Foreign Application Priority Data

Apr. 5, 1988 [JP] Japan .................................. 63-83666

[51] Int. Cl.$^5$ ............................................. G03B 15/03
[52] U.S. Cl. ................................. 354/420; 354/127.1; 354/145.1
[58] Field of Search ..................... 354/413, 420, 127.1, 354/127.11, 127.12, 127.13, 145.1

[56] References Cited

U.S. PATENT DOCUMENTS

| 4,422,744 | 12/1983 | Maida ............................ 354/127.12 |
| 4,494,851 | 1/1985 | Maida et al. ........................ 354/421 |
| 4,755,845 | 7/1988 | Taniguchi et al. ............. 354/127.13 |

Primary Examiner—Russell E. Adams
Attorney, Agent, or Firm—Shapiro and Shapiro

[57] ABSTRACT

An electronic flash device is detachably mountable on a camera and capable of data communication with said camera. The electronic flash device comprises a display unit for automatically setting photographing information upon receiving relevant data from the camera or manually setting photographing information. The display unit is set in a first display state when the device is mounted on a camera capable of data communication and data are transmitted therefrom, or is set in a different display unit when the device is mounted on a camera incapable of data communication and no data are transmitted therefrom.

6 Claims, 3 Drawing Sheets

ELECTRONIC FLASH DEVICE FOR CAMERA

BACKGROUND OF THE INVENTION

1. Field of the Invention

The present invention relates to an electronic flash device provided with display unit for displaying photographing information, such as film sensitivity, diaphragm value, adjustable illumination range etc.

2. Related Background Art

There is already proposed, in the U.S. Pat. No. 4,494,851 of the present applicant, an electronic flash device provided with a display unit for displaying photographing information such as film sensitivity, diaphragm value, adjustable illumination range etc. and capable of exchanging data relating to said photographing information with a camera.

Said electronic flash device is so constructed, when mounted on a camera body capable of data exchange, as to receive the photographing information from the camera body and display the same on the display unit, and, when mounted on a camera body incapable of such data exchange, as to display the photographing information on said display unit by the manipulation of photographing information setting members.

However, in the display unit of such electronic flash device, it has been impossible to identify whether the display of the photographing information is obtained by mounting on a camera capable of data exchange, or on a camera incapable of such data exchange. Such electronic flash device is therefore inconvenient for the user as it is not clear, during the use of the device, whether the setting of the photographing information is required in the electronic flash device.

SUMMARY OF THE INVENTION

The object of the present invention is to provide an electronic flash device capable of clarifying whether a manual setting is required for the photographing information, thereby preventing errors in the setting of the photographing information.

The foregoing object can be achieved, according to the present invention, by an electronic flash device detachably mountable on a camera and capable of data communication with said camera, comprising a display unit for automatically setting photographing information upon receiving relevant data from said camera or manually setting photographing information, wherein said display unit is set in a first display state when said device is mounted on a camera capable of data communication and data are transmitted therefrom, or is set in a different display unit when said device is mounted on a camera incapable of data communication and no data are transmitted therefrom.

DESCRIPTION OF THE PREFERRED EMBODIMENTS

Structure of Electronic Flash Device

Figure 1:
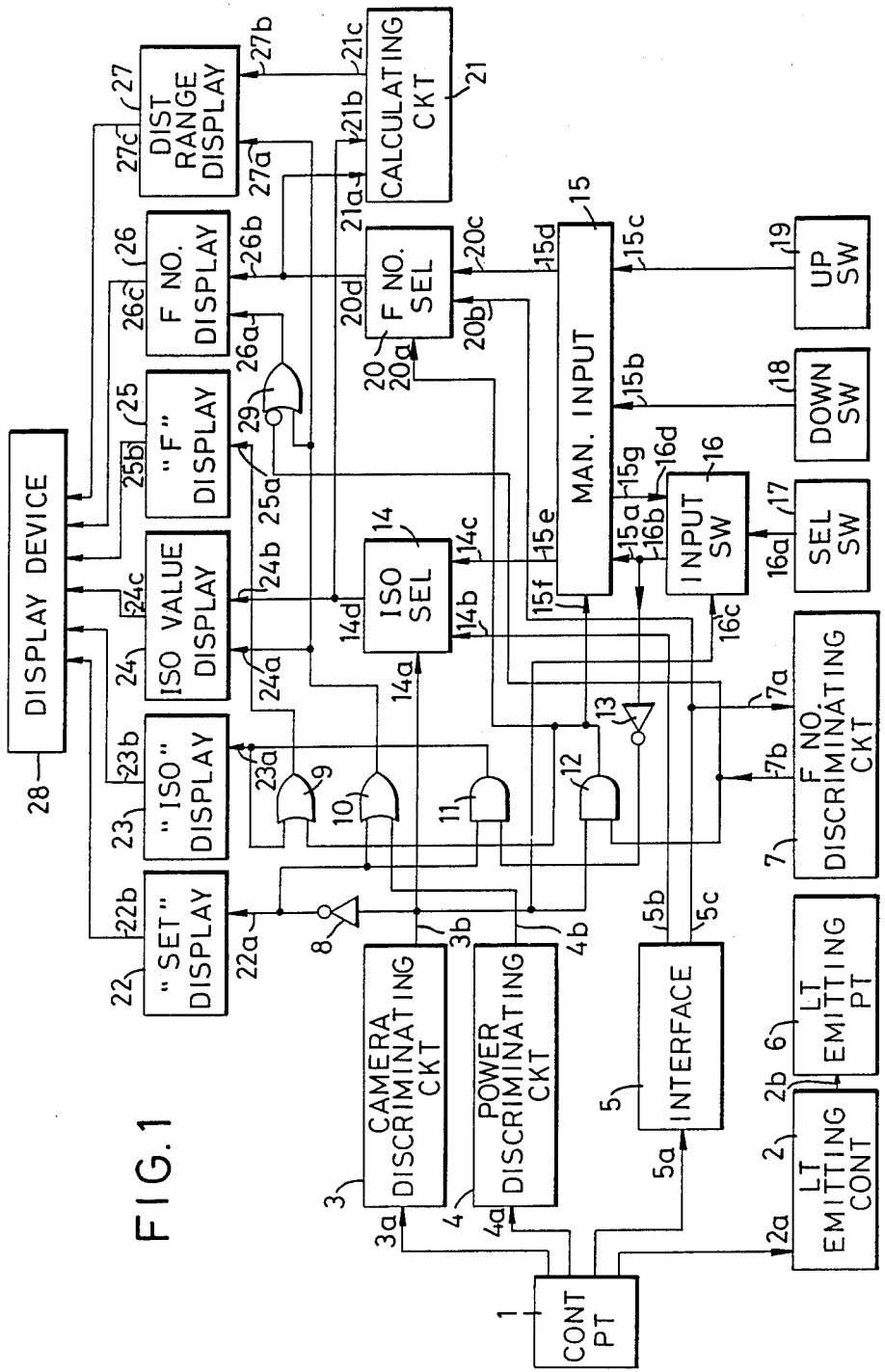
FIG. 1 is a block diagram of an electronic flash device.

Referring to FIG. 1, a contact part 1 of the electronic flash device is provided with plural electrical contacts, to be connected with contacts of a hot shoe of a camera to be explained later, for exchanging signals with said camera. A light emission control circuit 2 and a light emitting part 6 initiate and terminate light emission respectively in response to a light emission start signal and a light emission end signals, to be received from the camera through the contact part 1.

A camera discriminating circuit 3 discriminates, either mechanically or electrically through the contact part 1, whether the mounted camera is one capable of releasing data on the diaphragm aperture and film sensitivity (hereinafter called camera D) or another camera (hereinafter called camera M). Said discriminating circuit 3 sends an H-level signal or an L-level signal on an output line 3b, respectively upon detection of a camera D or a camera M.

A power discriminating circuit 4 is connected to the camera through the contact part 1, and sends an H-level signal or an L-level signal to an output line 4b, respectively when the power supply of the camera is turned on or off.

A data interface circuit 5 receives data on the film sensitivity (ISO-number) and diaphragm aperture (F-number) through the contact part 1, when the electronic flash device is mounted on a camera D, and sends the data of ISO number and the data of F-number respectively to output lines 5b and 5c. The transmission of said data through the contact part 1 may be conducted through exclusive contacts provided therein, or through contacts already used for other purposes.

An F-number discriminating circuit 7 discriminates the F-number output received from the data interface circuit 5 through an input line 7a, and releases an H-level signal or an L-level signal through an output line 7b, respectively when F-number data are received from the camera, or when F-number is not clear from the received data.

An ISO-number selecting circuit 14 receives a control signal from the camera discriminating circuit 3 through an input line 14a, and, in case of an H-level control signal, transmits data on the ISO number, received from the data interface circuit 5 through an input line 14b, to an output line 14d, but, in case of an L-level control signal, transmits the ISO-number, received from a manual ISO/F number input circuit 15 through an input line 14c, to said output line 14d.

An F-number selecting circuit 20 receives a control signal from an AND gate 12 through an input line 20a, and, in case of an H-level control signal, transmits data on the F-number, received from the data interface circuit 5 through an input line 20b, to an output line 20d, but, in case of an L-level control signal, transmits the ISO-number, received from the manual ISO/F number input circuit 15 through an input line 20c, to the output line 20d.

A distance range calculating circuit 21 calculates a distance range for illumination adjustment, from the data on the F-number received from an input line 21a and the data on the ISO-number received from an input line 21b.

The manual input circuit 15 receives an ISO-number or an F-number by means of a selector switch 17, a down-switch 18 and an up-switch 19, which are push switches provided on the electronic flash device. The F-number and ISO-number thus entered are stored in the manual input circuit 15 regardless of the state of an input line 15a, and the ISO-number and the F-number are constantly released through output lines 15e, 15d. At the start of power supply, the ISO-number and the F-number are initialized at ISO 100 and F5.6, respectively.

An input switch circuit 16 alternately sends an H-level signal and an L-level signal to the manual input circuit 15, upon each operation of the selector switch 17. After the input of the ISO-number of the F-number is selected by said switch 17, the ISO-number or the F-number is shifted up or down, by the switch 18 or 19, by a ⅓ step or a step. However, such input of the F-number or ISO-number is possible only when the input line 15f is at the L-level. When it is at the H-level, the stored values of the F-number and ISO-number do not change by the manipulation of the switches 18, 19.

An output line 16b of the input switch circuit 16 alternately assumes the H-level and L-level at every operation of the switch 17 when the input line 16c is in the L-level state. However the output line 16b is automatically shifted to the H-level if it is left at the L-level state for a predetermined period (several seconds). When the switch 18 or 19 is actuated for setting the ISO-number, a signal indicating the actuation of said switch is transmitted from the manual input circuit 15 to the input switch circuit 16 through an output line 15g, whereby the time counting for resetting the output line 16b to the H-level is reset, so that said setting of the output line 16b to the H-level state takes place after the predetermined period from the completion of the operation of the switch 18 or 19. Once assuming the H-level state, the output line 16b does not change its state. Also, if an input line 16c is in the H-level state, the output line 16b assumes the H-level state regardless of the input signal from the switch 17. Also at the start of power supply, the output line 16b is initialized at the H-level state.

A SET display circuit 22 turns on or off a SET indicator on the display unit, respectively when an input line 22a is at the H- or L-level state.

An ISO display circuit 23 flashes or turns on an ISO indicator on the display unit, respectively when an input line 23a is at the H- or L-level state.

An ISO-number display circuit 24 displays the ISO-number with numerals or extinguishes said display, respectively when an input line 24a is at the H- or L-level state.

An F display circuit 25 turns on or flashes an F indicator on the display unit, respectively when an input line 25a is at the H- or L-level state.

An F-number display circuit 26 displays the F-number with numerals or extinguishes said display, respectively when an input line 26a is at the H- or L-level state.

A distance range display circuit 27 displays the result of calculation of the distance range for illumination adjustment, supplied from an input line 27b, in the form of a bar graph on the display unit, or extinguishes said display, respectively when an input line 27a is at the H- or L-level state.

Figure 2:
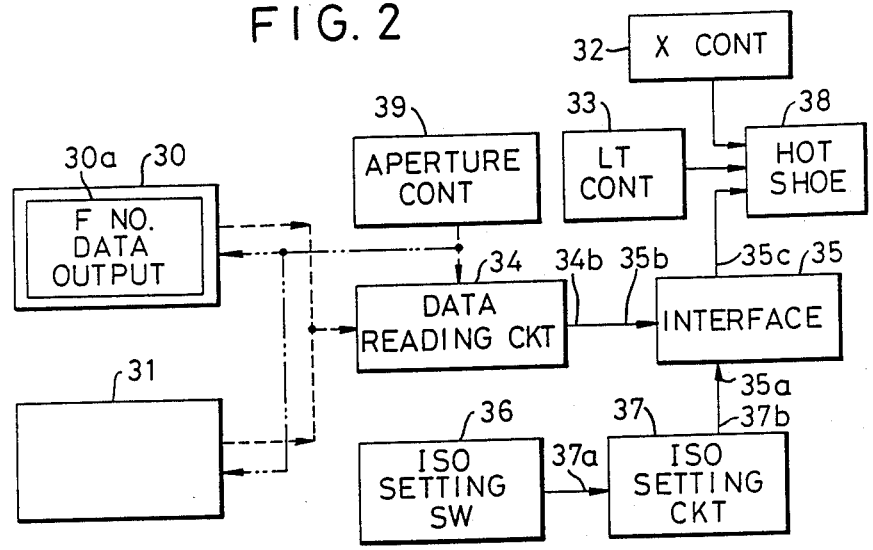
FIG. 2 is a block diagram of a camera capable of data communication to be mounted on said electronic flash device.
Figure 3:
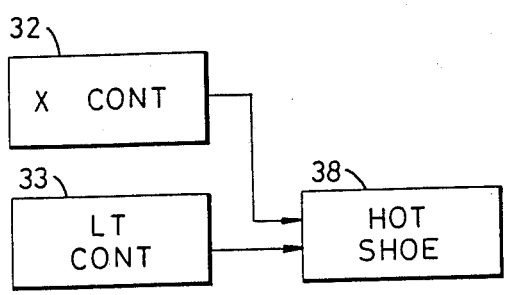
FIG. 3 is a block diagram of a camera incapable of data communication to be mounted on said electronic flash device.

FIGS. 2 and 3 are block diagrams of cameras on which the electronic flash device shown in FIG. 1 can be mounted. FIG. 2 shows a camera D capable of TTL light adjustment, provided with data communication function for releasing, through hot shoe contacts 38, data of the F-number of the lens mounted on the camera and data of the ISO-number set on the camera. FIG. 3 shows a camera M capable of TTL light adjustment without data communication function.

Structure of camera D

Referring to FIG. 2, hot shoe contacts 38 are connected to the contact part 1 of the electronic flash device shown in FIG. 1. A known X-contact 32 and a known TTL light control circuit 32 are connected to said hot shoe contacts 38 and release a light emission start signal and a light emission end signal.

An ISO setting circuit 37 sends data of an ISO-number, set by an ISO setting switch 36, to an output line 37b.

An F-number data reading circuit 34 sends an F-number read from a lens 30 equipped with an F-number data output circuit 30a, or an F-number determined by an aperture control circuit 39, to a data interface circuit 35. The F-number from the F-number data output circuit 30a of the lens or that from the aperture control circuit 39 is selected according to the exposure control mode of the camera. The former F-number is supplied to the data interface circuit 35 in a manual mode or a diaphragm aperture preferential mode, in which the diaphragm aperture is determined by the photographer, while the latter F-number is supplied to the data interface circuit 35 in a shutter preferential mode or a program mode, in which the diaphragm aperture is controlled according to the light measurement in the camera.

When a lens 31 as explained above is mounted, data are obtained according to the selected F-number of said lens. However, when there is mounted a lens 31 incapable of releasing the F-number data, the F-number data reading circuit 34 releases data indicating that the F-number is unidentified.

The data interface circuit 35 sends the data of the F-number and the IOS-number to the hot shoe contacts 38.

Structure of camera M

Referring to FIG. 3, the camera M, incapable of data communication, is provided with the X-contact 32, TTL light control circuit 33 and hot shoe contacts 38.

Now reference is made to FIGS. 4 to 7 for explaining the examples of display on the display unit provided, for example, on the rear face of the electronic flash device shown in FIG. 1.

Figure 4:
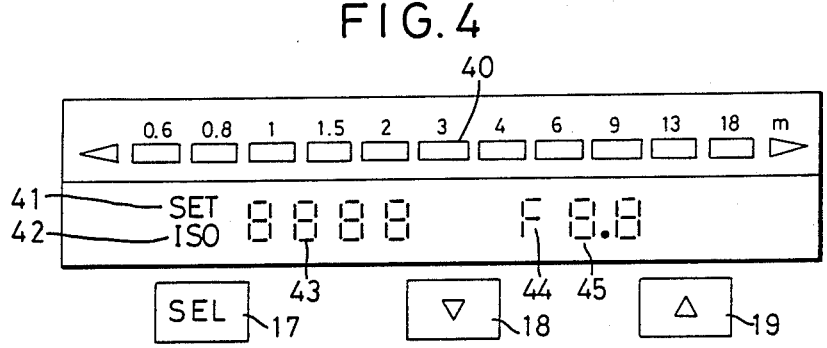
FIGS. 4, 5, 6 and 7 are schematic views showing display states of a display unit.

FIG. 4 shows a state in which all the displays in the display unit are turned on. Display 40 consists of display segments indicating the distance range of light control. Displays 41, 42 and 44 are respectively a SET indicator, an ISO indicator and an F indicator. Displays 43 and 45 are 7-segment numeral displays respectively for ISO-number and F-number. Switches 17 to 19 are push switches explained before.

Display example 1 (FIG. 5)
(When the electronic flash device is mounted on a camera M incapable of data communication)

The electronic flash device functions in the following manner, regardless of the on or off state of the power supply in the camera M.

The camera discriminating circuit 3 releases an L-level signal through the output line 3b.

Consequently the input lines 14a, 20a assume the L-level state, whereby the ISO-number selecting circuit 14 and the F-number selecting circuit 20 select the ISO-number and F-number entered from the manual input circuit 15. Also input lines 24a, 26a and 27a of the ISO display circuit 24, F-number display circuit 26 and distance range display circuit 27 assume the H-level state, whereby these circuits continuously display the ISO-number, F-number and distance range of light control. Also an input line 22a of the SET display circuit 22 assumes the H-level state, whereby said circuit turns on the SET display 41 (FIG. 5) thereby requesting the photographer to manually set the ISO-number and the F-number.

At first there will be explained the manual setting of the F-number.

Figure 5:
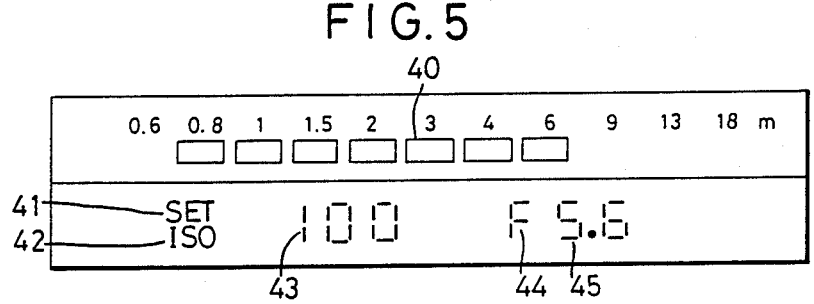

At the start of power supply in the electronic flash device, the manual input circuit 15 displays the initial setting of the ISO-number at 100 and the F-number at F5.6 as shown in FIG. 5, and the distance range display circuit 27 displays the distance range enabling light control, calculated from these data.

The input switch circuit 16 releases an H-level signal by the initialization, whereby the AND gate 11 releases an L-level output signal. Thus the input line 23a of the ISO display circuit 23 assumes the L-level state to turn on the ISO display 42 (FIG. 5). Also an OR gate 9 releases an L-level output signal, whereby the F display circuit 25 flashes the F display 44 (FIG. 5).

From the above-mentioned display state of the ISO display circuit 23 and the F display circuit 25, the photographer can recognize that the F-number, which is in flashing state, can be entered. Also the manual input circuit 15 can accept the input of the F-number as the input line 15a is in the H-level state. The F-number can be varied by a step by every actuation of the switch 18 or 19, and the photographer can achieve the F-number setting by looking at the thus varied F-number displayed on the display unit 28.

In the following there will be explained the manual setting of the ISO-number.

If the SEL switch 17 is depressed in this state, the output line 16b of the input switch circuit 16 is shifted to the L-level state, whereby the AND gate 11 and the OR gate 9 release H-level output signals. Thus the F display circuit 25 continuously turns on the F display, while the ISO display circuit 23 flashes the ISO display.

From the above-mentioned display state of the ISO display circuit 23 and the F display circuit 25, the photographer can recognize that the F-number, which is in flashing state, can be entered. The ISO-number can be varied by a ⅓ step by every actuation of the switch 18 or 19, as in the manual setting of F-number explained above, and the photographer can achieve the ISO-number setting by looking at thus varied ISO-number displayed on the display unit 28. The F-number input state is restored if the SEL switch 17 is actuated again in the ISO-number input state or after the lapse of a predetermined period in said state.

Figure 6:
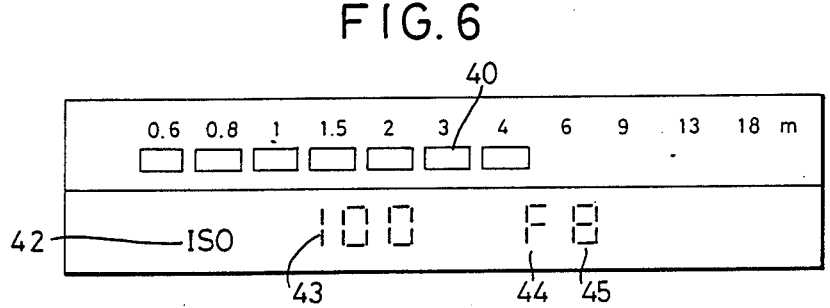

Display example 2 (FIGS. 6 and 7)
(When the electronic flash device is mounted on a camera D with a lens 30)
(1) When the power supply in the camera is turned on (FIG. 6)

When the power supply in the camera is turned on, the output lines 3b, 4b of the camera discriminating circuit 3 and the power discriminating circuit 4 release H-level output signals.

In the camera D shown in FIG. 2, the F-number data from the lens 30 and the ISO-number data are supplied to the hot shoe contacts 38 through the data interface circuit 35. In the electronic flash device, said data are received by the data interface circuit 5, through the hot shoe contacts 38 of the camera and the contact part 1 of the device, and sends the ISO-number data and the F-number data respectively to the output lines 5b and 5c. In response, the output line 7b of the F-number data discriminating circuit 7 assumes the H-level state.

Since the output lines 3b, 4b and 7b are in the H-level state, the outputs of the OR gate 9, OR gate 10, AND gate 11 and AND gate 12 respectively assume the H-, H-, L- and H-level states, whereby he circuits function in the following manner.

The ISO number selecting circuit 14 and the F-number selecting circuit 20 release the ISO-number data and the F-number data supplied from the data interface circuit 5. These data are displayed on the display unit 28 and are used in the calculation of the distance range enabling light control, and the result is displayed on the display unit 28 by the distance range display circuit 27.

Figure 7:
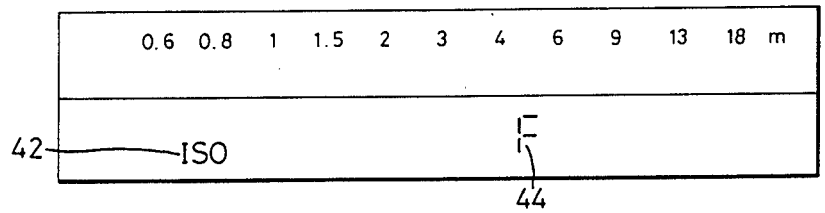

The input line 22a of the SET display circuit 22 assumes the L-level state, whereby said circuit turns off the SET display 41 (FIGS. 6 and 7), indicating that the manual inputs of the ISO-number and the F-number are unnecessary. The input lines 23a, 25a of the ISO display circuit 23 and the F display circuit 25 respectively assume the L- and H-level states, whereby the displays 42, 44 are both turned on (FIGS. 6 and 7). This display state is continued regardless of the actuation of the SEL switch 17, indicating that the data of the ISO-number and the F-number are automatically transmitted from the camera D, and that the manual setting is unnecessary and disabled. FIG. 6 illustrates a state in which data for ISO 100 and F8 are transmitted from the camera D.

As the input line 15f of the manual input circuit 15 is in the H-level state, the inputs by the switches are disabled, and the data stored in the manual input circuit 15 are not changed by the actuation of the actuations of the switches.

As explained in the foregoing, in the combination with a camera D equipped with a lens 30, the data for the ISO-number and the F-number used for display and calculation are sent from the camera. Also the SET display and the flashing ISO or F display, requesting manual input, are respectively extinguished or continuously turned on, thereby avoiding erroneous operation.

(2) When the power supply in the camera is turned off (FIG. 7)

The camera D cannot release the data of the ISO-number and F-number, when the power supply thereof is turned off.

In this state the output line 4b of the power discriminating circuit 4 of the electronic flash device assumes the L-level state, whereby the OR gate 10 releases an L-level output signal. Thus the input lines 24a, 27b of the ISO-number display circuit 24 and the distance range display circuit 27 assume the L-level signal. Also the output line 7b of the F-number data discriminating circuit 7 assumes the H-level state by storing the state when the power supply is turned on, whereby the OR gate 29 releases an L-level output signal. Thus the input line 26a of the F-number display circuit 26 assumes the L-level state.

Consequently the displays 43, 45, 40 for the ISO-number, F-number and distance range are turned off, whereby erroneous display can be avoided.

Display example 3
(When the electronic flash device is mounted on a camera D equipped with a lens 31)

(1) When the power supply in the camera D is turned on:

The display for the ISO-number data is same as in the foregoing display example 2.

Since the lens 31 does not have the F-number data output circuit as shown in FIG. 2, the F-number data reading circuit 34 of the camera D releases data indicated an unidentified F-number. In response, the F-number data discriminating circuit 7 of the electronic flash device releases an L-level signal through the output line 7b, whereby the AND gate 12 releases an L-level output signal to enable the manual input operations on the manual input circuit 15.

Also the OR gate 9 releases an L-level output signal. Receiving the L-level signal on the input lines 25a, the F display circuit 25 flashes the F display 44, indicating that the input of the F-number is enabled.

As explained in the foregoing, in the combination with a camera D equipped with a lens 31, the data for the ISO-number are transmitted from the camera, while the data for the F-number can be manually entered, in the same manner as in the foregoing display example 2.

(2) When the power supply in the camera D is turned off:

In the foregoing display example 2, the displays for the ISO-number, F-number and distance range are turned off when the power supply in the camera is turned off. However, in the combination with the lens 31, since the data for the F-number are not automatically obtained from the camera, the output line 7b of the F-number data discriminating circuit 7 assumes the L-level state, whereby the OR gate 29 releases an H-level output signal, thereby displaying the F-number and enabling manual setting.

The present invention is not limited to the foregoing embodiments. For example it is also possible, when the electronic flash device is mounted on a camera capable of data communication, to display, for example, a message AUTO on the display unit of said flash device thereby indicating the automatic setting of the photographing information, and, when it is mounted on a camera incapable of data communication, to display, for example, a message SET on said display unit thereby requesting the photographer to manually set the photographing information.

In the present invention, as explained in the foregoing, when the electronic flash device is mounted on a camera capable of data communication, the display on photographing information appearing on a display unit of said flash device is shifted to a first display state, and the change of display by second setting means is disabled. On the other hand, when said flash device is mounted on a camera incapable of data communication, said display is shifted to a second display state, thereby enabling the change of display by said second setting means. Consequently the photographer can know whether he has to manually enter the data on photographing by looking at the display unit of the electronic flash device, so that unnecessary manual setting can be avoided.

We claim:

1. An electronic flash device adapted to be mounted on a first camera body capable of releasing data on photographing information, or a second camera body incapable of releasing data on photographing information, comprising:
   (a) display means;
   (b) setting means for manually setting data on photographing information;
   (c) control means for causing said display means to display data set by said setting means in a first display state;
   (d) transmission means for transmitting data from said first camera body to said control means when said electronic flash device is mounted on said first camera body; and
   (e) means for releasing a detection signal upon detection that said electronic flash device is mounted on said first camera body, wherein said control means is adapted, in response to said detection signal, to cause said display means to display the data from said transmission means in a second display state different from said first display state.

2. An electronic flash device according to claim 1, wherein said display means comprises a first display portion for displaying data on the photographing information and a second display portion for displaying information different from said photographing information, and said control means is adapted to show display on said second display portion in said first state, but not to show display on said second display portion in said second state.

3. An electronic flash device according to claim 2, wherein said setting means is adapted to set plural photographing information, and said control means is adapted to cause said display means to display which photographing information is set-table by said setting means.

4. An electronic flash device according to claim 3, wherein said control means is adapted to cause said display means, after a display for a predetermined period that a predetermined one among plural photographing information can be set, to display that another photographing information, different from said predetermined one, can be set.

5. An electronic flash device adapted to be mounted on a first camera body capable of releasing data on photographing information, or a second camera body incapable of releasing data on photographing information, comprising:
   (a) setting means for manually setting data on photographing information;
   (b) input means for entering data from said first camera body when said electronic flash device is mounted on said first camera body;
   (c) display means having a first display portion and a second display portion; and
   (d) control means for causing said first display portion to display data from said input means when said electronic flash device is mounted on the first camera body, or causing said first display portion to display data from said setting means when said electronic flash device is mounted on the second camera body, said control means being adapted, upon detection that said electronic flash device is not mounted on said first camera body, to cause said second display portion to indicate that said electronic flash device is not mounted on said first camera body.

6. An electronic flash device adapted to be mounted on a first camera body capable of releasing data on photographing information, or a second camera body incapable of releasing data on photographing information, comprising:
   (a) display means;
   (b) means for releasing a detection signal upon detection that said electronic flash device is not mounted on said first camera body; and
   (c) means for causing a display on said display means in response to said detection signal.

* * * * *